(12) United States Patent
Mankins

(10) Patent No.: US 6,390,118 B1
(45) Date of Patent: May 21, 2002

(54) APPARATUS AND METHOD FOR TESTING PLUMBING SYSTEM

(76) Inventor: John M. Mankins, 7320 Pinal Ave., Atascadero, CA (US) 93422

( * ) Notice: Subject to any disclaimer, the term of this patent is extended or adjusted under 35 U.S.C. 154(b) by 0 days.

(21) Appl. No.: 09/483,188

(22) Filed: Jan. 14, 2000

Related U.S. Application Data

(60) Continuation of application No. 09/034,880, filed on Mar. 4, 1998, now Pat. No. 6,161,563, which is a division of application No. 08/777,407, filed on Dec. 30, 1996, now Pat. No. 5,740,380.

(51) Int. Cl.$^7$ .......................... F16K 43/00; G01M 3/04; F16L 55/11
(52) U.S. Cl. ................... 137/318; 137/15.14; 137/68.3; 73/46; 73/49.1; 73/49.5; 73/49.8; 138/90
(58) Field of Search ................... 73/40.5 R, 46, 73/49.1, 49.5, 49.6, 49.8; 4/679, 680, 681; 137/15.11, 15.13, 15.14, 318, 247.47, 247.51, 68.27, 68.3; 138/89, 90, 94; 15/104.3, 104.31, 104.33, 104.095

(56) References Cited

U.S. PATENT DOCUMENTS

| | | | |
|---|---|---|---|
| 396,177 A | 1/1889 | Smith | 137/318 |
| 2,756,486 A | 7/1956 | Smith | 137/318 |
| 2,972,915 A | 2/1961 | Milanovits et al. | 137/318 |
| 3,272,033 A | 9/1966 | Leopold, Jr. et al. | 137/318 |
| 3,335,742 A | 8/1967 | Novak | 137/318 |
| 3,598,141 A | 8/1971 | Yamo | 137/318 |
| 3,646,954 A | 3/1972 | Hutton | 137/318 |
| 3,928,885 A | 12/1975 | Peterson et al. | 15/104.3 |
| 4,128,107 A | 12/1978 | Blumhardt | 137/318 |
| 4,216,793 A | 8/1980 | Volgstadt et al. | 137/318 |
| 4,364,140 A * | 12/1982 | Irwin | 15/104.33 |
| 4,429,568 A | 2/1984 | Sullivan | 138/90 |
| 4,475,566 A | 10/1984 | Haines | 137/318 |
| 4,587,859 A | 5/1986 | Coombes et al. | 137/318 |
| 4,598,731 A | 7/1986 | Colson | 137/318 |
| 4,611,624 A | 9/1986 | Snyder | 137/318 |
| 4,626,142 A | 12/1986 | Brin et al. | 408/81 |
| 4,761,024 A | 8/1988 | Ewen | 137/318 |
| 4,936,350 A | 6/1990 | Huber | 138/90 |
| 5,033,510 A | 7/1991 | Huber | 138/90 |
| 5,044,393 A | 9/1991 | Jiles | 137/318 |
| 5,056,176 A * | 10/1991 | Belcher | 15/104.095 |
| 5,163,480 A | 11/1992 | Huber | 138/90 |
| 5,199,129 A * | 4/1993 | Salecker et al. | 15/104.33 |
| 5,418,997 A | 5/1995 | DeFrange | 15/104.31 |
| 5,620,020 A | 4/1997 | Collins | 137/318 |
| D379,851 S | 6/1997 | Mathison | D23/260 |

* cited by examiner

*Primary Examiner*—George L. Walton
(74) *Attorney, Agent, or Firm*—Leo F. Costello

(57) ABSTRACT

A method and apparatus for testing a plumbing system in a more dependable and cost-effective manner. During the rough-in plumbing phase of construction, the drain pipe leading from the plumbing system in a building to the city sewer main or main sewer line is positively sealed off by a test cap or plug welded in the pipe at the location of the clean-out. Access to the test cap is maintained through the clean-out. Pressurizing the rough-in plumbing to test the same can then proceed knowing that if any leaks occur, they are in the branch plumbing on the building side of the test cap, and not at or in the test cap. Following successful completion of the initial test, the top-out plumbing job is completed, leaving the test cap welded in the clean-out or drain pipe. After the roof vents are in, the second test of the plumbing system is made, again knowing that if the system shows any leaks, they are the result of a failure in the plumbing work and not a failure of the test cap. After the plumbing system has passed final test and inspection, a special tool or apparatus in accordance with the present invention is inserted down the clean-out to penetrate and ream-out the test cap, so that the drain pipe is opened and provides a passageway through which the waste can flow to the sewer line.

41 Claims, 5 Drawing Sheets

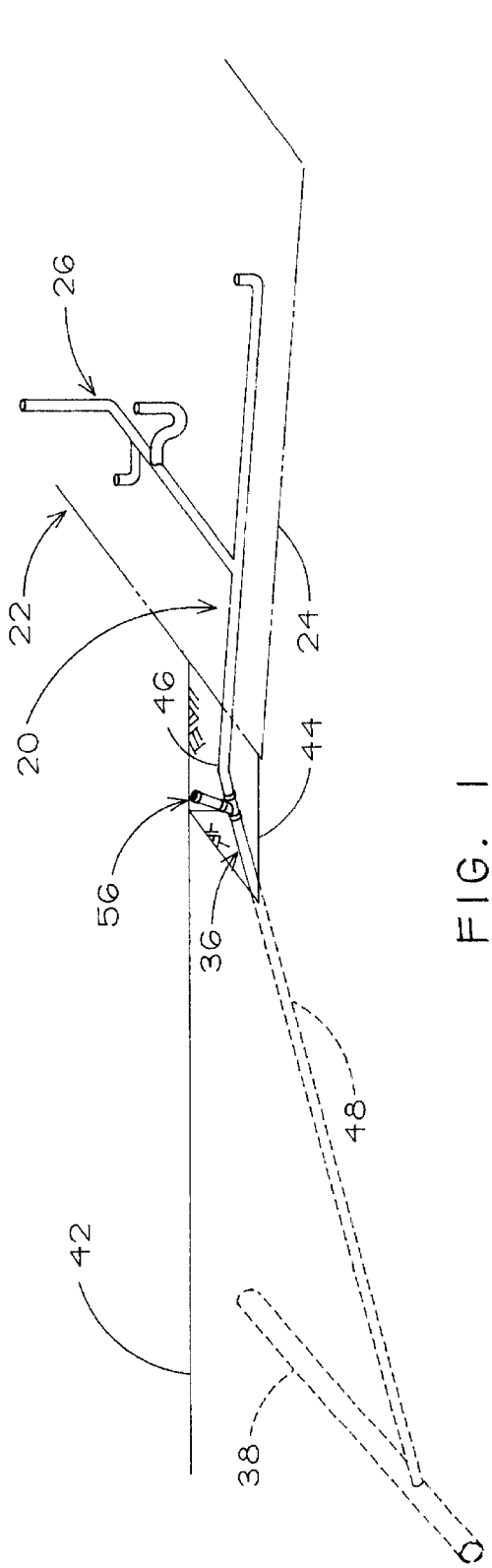
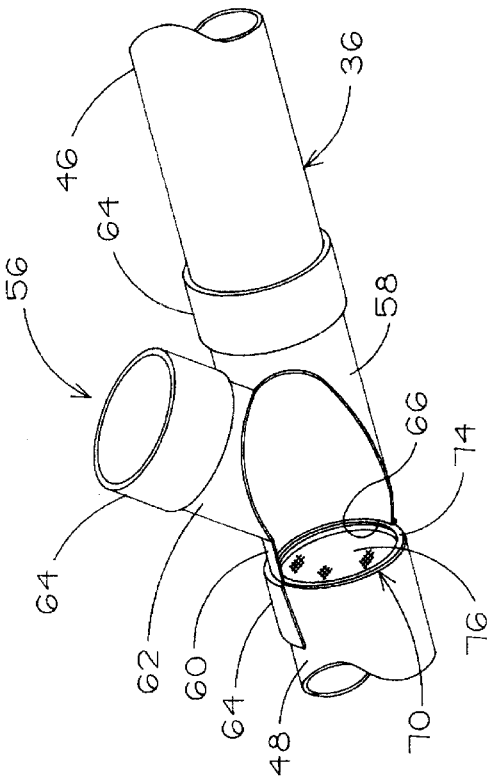
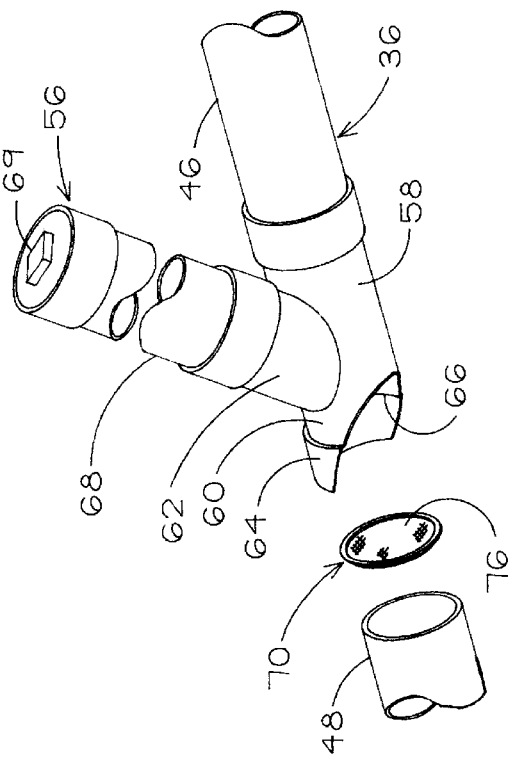

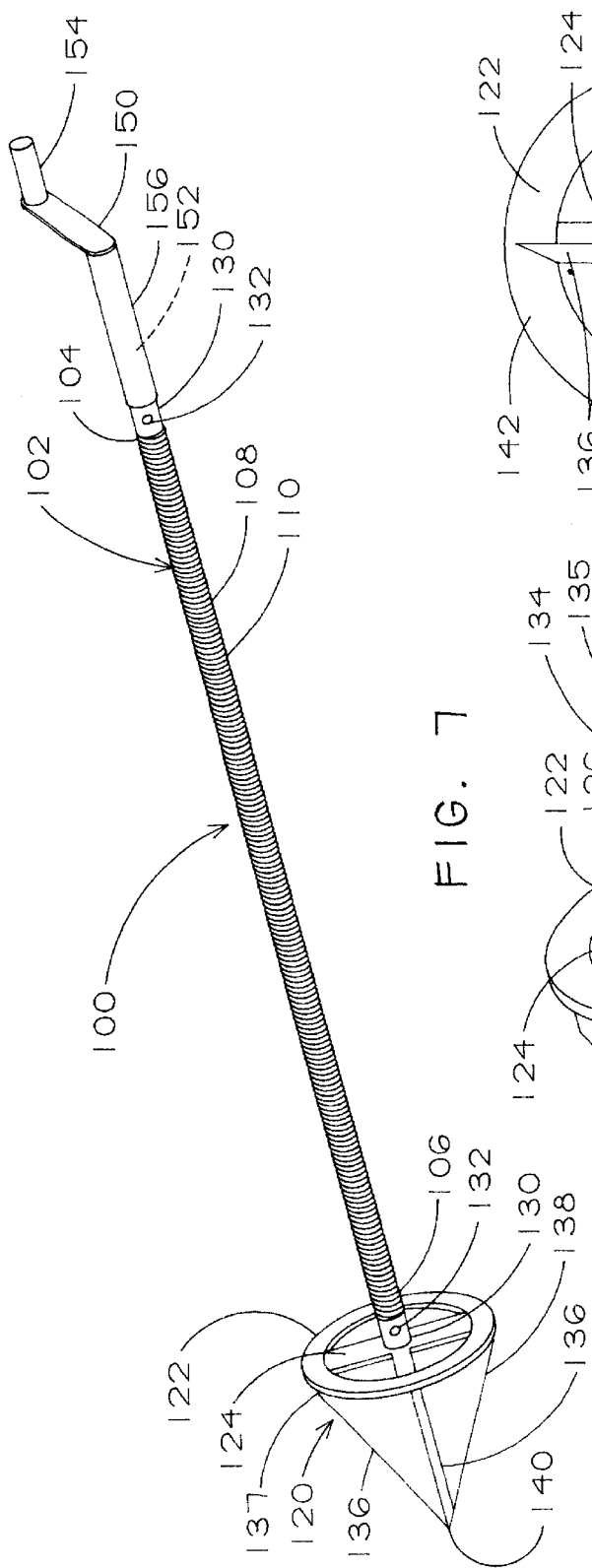
FIG. 7
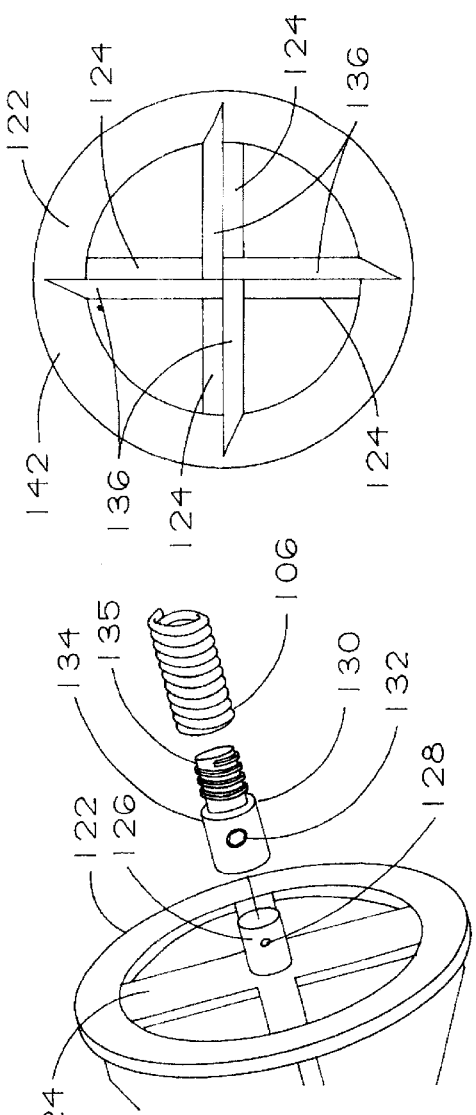
FIG. 8
FIG. 9
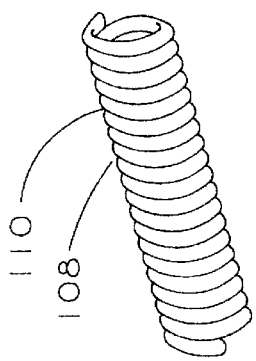
FIG. 10

APPARATUS AND METHOD FOR TESTING PLUMBING SYSTEM

CROSS-REFERENCE TO RELATED APPLICATION

This application is a continuation of my application Ser. No. 09/034,880, filed Mar. 4, 1998, now Pat. No. 6,161,563 which in turn is a divisional of my Ser. No. 08/777,407, filed Dec. 12, 1996 parent application, now Patent No. 5,740,830.

FIELD OF THE INVENTION

The present invention pertains to the an apparatus and method for testing a plumbing system and more particularly to a method for testing the integrity of a newly installed plumbing system and to a tool used in performing the method.

BACKGROUND

In residential house construction cad as is well known, the plumbing is basically installed in three stages, namely, the rough-in plumbing, top-out plumbing and finish plumbing. The rough-in plumbing occurs prior to pouring of concrete. Top-out plumbing follows framing the building and involves installing the pipes in the walls and vent pipes that extend up through the roof of the structure. Finish plumbing relates to setting toilets, sinks, and the like.

The rough plumbing includes laying a drain or waste pipe which leads from building to the city sewer main normally in the access street or road adjacent to the building. It is common practice to insert a clean-out in the drain pipe between the pipes in the building and the section of the drain pipe that leads to the sewer line. This clean-out may be located in a basement or, in a building without a basement, outside the building and underground. If underground, the clean-out has a branch extending to the surface of the ground for providing access to the drain pipe both during construction and during use of the building.

As is well known, in order to pass the rigid inspection normally imposed by building codes, it is necessary to test the drainage part of the plumbing system after the rough-in and top-out stages are finished. For this purpose, common procedures and devices are in use. The devices include test caps and inflatable test plugs, so-called water-weenies. In use, the test caps are sealed at the ends of all open and exposed branch pipes, and the inflatable test plugs are used in the clean-out where the passageway plugged is not as accessible. After the tests, the exposed test caps are punched out with a hammer, and the inflatable plugs are deflated and pulled out of the clean-out. Thus, the test plugs and the inflatable plugs can be removed without disassembling and disturbing the tested system.

As indicated, the test caps in above-ground, accessible locations are usually knocked out with a hammer, whereupon the fragments are pried out with a screwdriver or pliers. If a test cap were sealed in a clean-out, however, whether the clean-out is relatively accessible in a basement or whether it is underground, it cannot be punched out with a hammer and screwdriver without disassembling part of the system and thereby disturbing the tested system. Thus, test caps have not been used to block the test pressure in the drain pipe.

Instead, during the rough-in plumbing stage, the inflatable weenie-shaped, test plugs have been inserted in the clean-out, used for the tests, and subsequently removed with a pull chain attached to the plug and extending out of the clean-out. More specifically, to test the rough-in plumbing, the plug is inserted and inflated thereby sealing the drain pipe. The plumbing on the building side of the plug is then pressurized to check for leaks. After the top-out phase is completed, the plumbing is again tested by again inflating the plug, and pressurizing the system, usually by feeding water into the system through the vent pipes in the roof.

Use of such inflatable weenie plugs for the described testing has proved unsatisfactory for several reasons. The essential problem is that the plugs often leak although the plumbing may be entirely sound. Either the plug does not seal perfectly circumferentially within the pipe or the plug is punctured as it is being slid in or out of the clean-out and against the rough surfaces thereof. As a result, the test fails not because of faulty plumbing, but because of a faulty plug. The plumbing crew will then need to be called back to the job to attend to the problem, causing aggravation and extra expense to the contractors and owners involved. Not only is there extra labor cost involved, but the failed inflatable test plugs must be replaced at considerable expense.

SUMMARY

A method and apparatus for testing a plumbing system in a more dependable and cost-effective manner is provided. During the rough-in plumbing phase of construction, the drain pipe leading from the plumbing system in a building to the city sewer main in the street is positively sealed off by a test cap or plug welded in the pipe at the location of the clean-out. Access to the test cap is maintained through the clean-out. Pressurizing the rough-in plumbing to test the same can then proceed knowing that if any leaks occur, they are in the branch plumbing on the building side of the test cap and not at or in the test cap. Following successful completion of the initial test, the top-out plumbing is completed, leaving the test cap welded in the clean-out or drain pipe. After the roof vents are in, the top-out test of the plumbing system is made, again knowing that if the system shows any leaks, they are the result of a failure in the plumbing work and not a failure of the test cap. After the plumbing system has passed final test and inspection, a special tool constructed in accordance with the present invention is inserted down the clean-out to penetrate and ream-out the test cap, so that the drain pipe is at substantially its normal inside diameter and provides a relatively full opening through which the waste can flow to the city sewer main in the street.

An object of this invention is to provide an improved method for testing a newly installed plumbing system and a tool used in performing the method.

Another object is to provide a more cost effective method for testing a newly installed plumbing system in a building.

A further object is to avoid having to re-test a plumbing system that would have passed the initial test but did not only because the test plug failed.

An additional object is to be able to test a newly installed plumbing system without using inflatable test plugs, so-called water weenies, to seal off the drain pipe while doing the testing and thereby to avoid the expense of frequently having to replace faulty plugs.

Yet another object is to be able positively to seal off a drain pipe in a plumbing system while pressurizing the system to test the system for leaks.

A still further object is to be able to remove a test plug that has been bonded in a drain pipe in a location that is accessible only thought a clean-out.

Another object is to provide a tool that can be extended into a clean-out and can remove plug or a portion thereof that has been bonded in a fluid-tight manner in a drain pipe to which the clean-out is connected.

Another object is to be able from a remote position to maneuver and guide a penetrating and reaming head of a tool inside a clean-out and into a position therein to penetrate and ream out a test cap welded in the clean-out.

Another object is to provide a tool for penetrating and reaming out a test cap out of a clean-out and that is adapted to attach penetrating and reaming heads of different sizes for different diameter pipes.

Another object is to provide a test cap-removing tool that is adapted to change its length depending on the distance between the test cap-to-be-removed and the location of the operator of the tool.

Another object to provide a test cap-removing tool that cooperates with a clean-out to leverage its operating head into an operating position and then allows the head to penetrate and ream out the test cap.

A further object is to enable a test plug that has been welded in fluid-tight relation in a drain pipe to be removed so that nearly the fill diameter of the drain pipe is available for conducting material therethrough after the plug has been removed.

These and other objects and advantages of the invention will become apparent upon reference to the accompanying drawings and the following detailed description.

DESCRIPTION OF THE DRAWINGS

FIG. 1 is an isometric view showing a schematic representation of a plumbing installation in a residential building construction that is intended to represent the plumbing installation after the rough-in plumbing or first stage of the plumbing installation has been completed and during which a clean-out is installed in a drain pipe leading from the building to a public sewer line.

FIG. 2 is an enlarged exploded isometric view of a part of FIG. 1, showing fragments of upper and lower sections, of the drain pipe, showing the clean-out with a branch thereof (partially broken away) to be connected to the lower section of the drain pipe, and showing a test cap to be connected to the lower section between the section and the branch of the clean-out.

FIG. 3 is a still further enlarged view similar to FIG. 2 but with the parts assembled, thereby showing the clean-out connected between the upper and lower sections of the drain pipe and showing the test cap connected to the lower section between that section and the clean-out so as to block flow through the clean-out from the upper section of the drain pipe to the lower section thereof.

FIG. 7 is an isometric view of a tool used in carrying out the method of the present invention and including an operating transversely a flexible shaft that also has axial rigidity and handles.

FIG. 8 is an enlarged end view of the head of the tool shown in FIG. 7.

FIG. 9 is an enlarged, exploded, isometric view of the tool of FIG. 7 with the head and shaft being fragmentary and showing how the head is releasably connected to the shaft.

FIG. 10 is an enlarged isometric view of the shaft showing the turns of the coil spring construction of the shaft.

DETAILED DESCRIPTION

Figure 4:
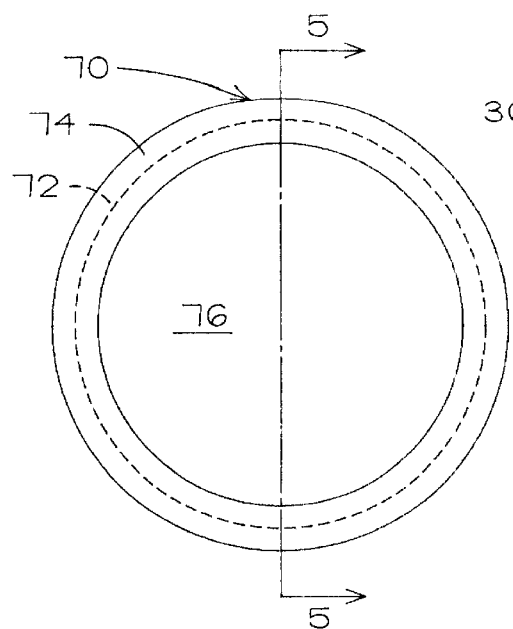
FIG. 4 is a still further enlarged end view of the test cap or plug shown in FIGS. 2 and 3 as seen from the upstream end of the cap.
Figure 5:
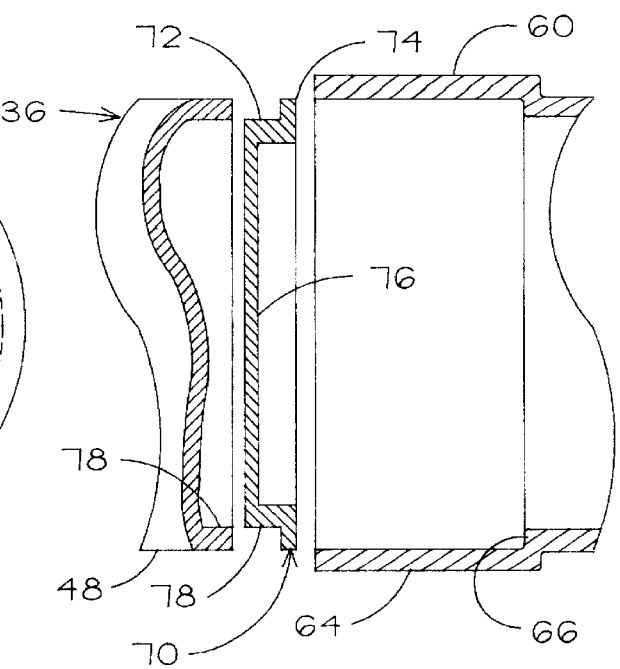
FIG. 5 is an exploded longitudinal diametrical section of the test cap taken on a plane indicated by line 5—5 of FIG. 4 but showing the test cap between the drain pipe and the clean-out and illustrating how these three parts will interfit when assembled.

Prior to describing the method and apparatus of the present invention, reference will be briefly made to the environment in which the invention is used. Thus, in FIG. 1, a plumbing system is schematically shown and generally indicated by the numeral 20 in a residential building construction 22, with the plumbing system being represented at the rough plumbing stage. Only the foundation area 24 and a few of the interior pipes 26 of the plumbing system are shown thereby indicating that only the basic pipes have been installed and that none of the finish plumbing is in nor are the appliances installed.

During the rough-in plumbing stage (FIG. 1), a drain pipe 36 is connected between the interior plumbing 26 and a city sewer main or public sewer line 38 which usually runs underneath the street or road in front of the construction 22. The drain pipe is typically made of a plastic such as ABS or PVC, but it may be cast iron or copper or other suitable material. For drainage purposes, the pipe usually has a three- or four-inch diameter and is laid with enough slope to enable drainage. As is well known, the ground 42 around the construction is excavated to provide a large trench or open area 44 below normal ground level so the drain pipe can be connected to the sewer line. The drain pipe has an upper section 46 connected to the interior plumbing and a lower section 48 connected to the sewer line.

A three-way clean-out 56 (FIGS. 1, 2 and 3), usually of the same material as the drain pipe 36, has inlet, outlet and clean-out branches 58, 60 and 62, each having a collar 64 and an annular shoulder 66. The collars of the inlet and outlet branches are respectively slid over and cemented to the upper and lower sections 46 and 48 of the drain pipe with the shoulders of the clean-out normally abutting the ends of the pipe sections. A riser 68 is connected to the clean-out branch and extends above the surface of the ground 42, and a clean-out cover 69 is releasably connected to the riser for sealing and closing this branch when necessary.

As is well-known, building codes typically require plumbing installations for new construction to be tested for leaks twice: after the rough-in plumbing is in and after the top-out plumbing is completed. It is currently standard practice to insert an inflatable plug, not shown, down the clean-out branch 62 and into the outlet branch 60, to inflate the plug, and thus to block the drain pipe 36 so the plumbing system can be pressurized for leaks. Since such plugs have not been satisfactory as discussed above, the principles of the present invention involve conducting the tests differently.

In accordance with the method of the present invention and as part of the rough-in plumbing phase (FIGS. 1–5), a test cap or plug 70 of well-known construction is fitted in and connected to the lower section 48 of the drain pipe 36, and then the clean-out 56 is connected between and joins the upper and lower sections 46 and 48 of the drain pipe. The test cap has an annular body 72, an annular flange 74 extending radially outwardly from the body, and a circular center plate 76 filling the body.

Test caps or plugs, as 70 (FIGS. 2 through 5), suitable for the purposes of the present invention are sold by the PASCO Company of 11156 Wright Road, Lynwood, Calif. 90262, as part Nos. 4844 and 4845. These caps are of plastic material capable of being solvent-welded to ABS or PVC pipe, and are also commonly and herein referred to as knock-out plugs or discs. They are available in various sizes so that their annular bodies 72 can be fitted in three- or four-inch diameter drain pipes 36.

As above stated and during the rough-in plumbing stage, the test cap (FIGS. 2 and 5) is fitted in the lower section 48 of the drain pipe with the body 72 received within the pipe, the flange 74 engaging the end of the pipe, and the center plate 76 disposed transversely of and within the pipe. Prior to making this assembly, layers of a suitable bonding cement are applied as at 78 to the mating surfaces so as to solvent-weld the parts together in the described assembly. After the test cap is welded in place (FIG. 13), the collar 64 of the outlet branch 60 of the clean-out is slipped over and solvent-welded to the lower section of the drain pipe with the shoulder 66 of the outlet branch abutting the radial flange 74 of the test cap. The resulting connection (FIG. 3) of the test cap in the drain pipe effects a fluid-tight seal that will block flow through the pipe. Either before or after this connection, the inlet branch 58 of the clean-out is connected to the upper section 46 of the drain pipe.

Following the described assembly (FIGS. 1 and 3) of the test cap 70, the clean-out 56, and the upper and lower sections 46 and 48 of the drain pipe 36, the rough-in plumbing is subjected to a first pressure test. Such pressurization is accomplished in a well-known manner that includes introducing water into the system through an open end of a pipe in the interior plumbing 26. It is of course understood and well known that all open ends of the pipes in the system 20 are plugged including attaching the clean-out fitting 69 to the riser 68 of the clean-out branch 62. Such pressurization imposes fluid pressure on the upstream side of the test cap on the side thereof opposite from the sewer line 38. Since the test cap is bonded in fluid-tight relation with the drain pipe, no leaks will occur through or around the test cap. As a result, if there is any loss of pressure in the plumbing system, it will clearly be in the plumbing system itself and not in the plugging of the drain pipe by the test cap, as contrasted with the frequent leaks of the inflatable test plugs, as described above.

Figure 6:
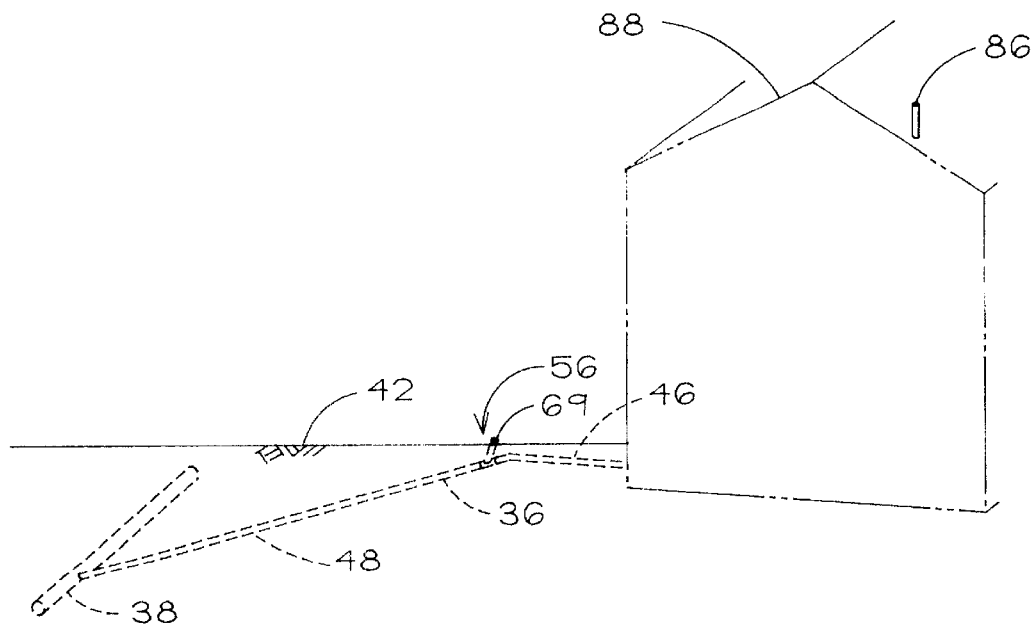
FIG. 6 is a view similar to FIG. 1 but on a reduced scale and intended to represent the plumbing system after the second or top-out stage thereof has been completed.

After the plumbing system 20 has passed the initial test at the rough-in plumbing stage, construction of the building continues (FIG. 6) including completion of the top-out plumbing job. This involves installation of one or more roof vents, as 86, extending up through the roof of the building, represented at 88. As part of finishing the construction, the ground 42 around the building is filled and graded, leaving the riser 68 exposed above ground level to allow access to the clean-out 56.

During the completion of the building 88 (FIG. 6), the test cap 70, the clean-out 56 and the drain pipe 36 are not disturbed and thus remain connected in the described relationship (FIG. 3). After the top-out stage is completed, a second test of the plumbing system 20 is conducted by again pressurizing the system 20 but this time typically by feeding water with a hose through an open roof vent, as 86. Once more, the test cap absolutely blocks flow through the drain pipe so that if there are any leaks in the system, they will be in the system and not in the plug in the drain pipe. If the system is sound, only one additional test is needed, but of course if there are leaks, they must be repaired and the test repeated until all problems are corrected.

Following successful passage of the second or final test or tests, however, it is of course necessary to remove the blockage caused by the test cap 70. In accordance with the principles of the present invention, the blockage is removed by a special plumbing tool 100 (FIGS. 7–11). This tool includes an elongated transversely flexible shaft 102, preferably about four feet long and preferably about ¾" in diameter, and having an upper or proximate end 104 and a lower or distal end 106. In the disclosed embodiment, the shaft is a tightly wound coil spring 108 (FIG. 10) made of wire, the adjacent turns 110 of which are in close engagement when the shaft is unflexed, thereby imparting a measure of axial rigidity to the shaft notwithstanding its transverse flexibility. Coil springs, as 108, suitable for the shaft of the present invention are sold as part No. 9504 by the Marco Products Company of Sylmar, Calif. Alternatively, other types of flexible shafts or cables with a measure of axial can be employed.

Figure 13:
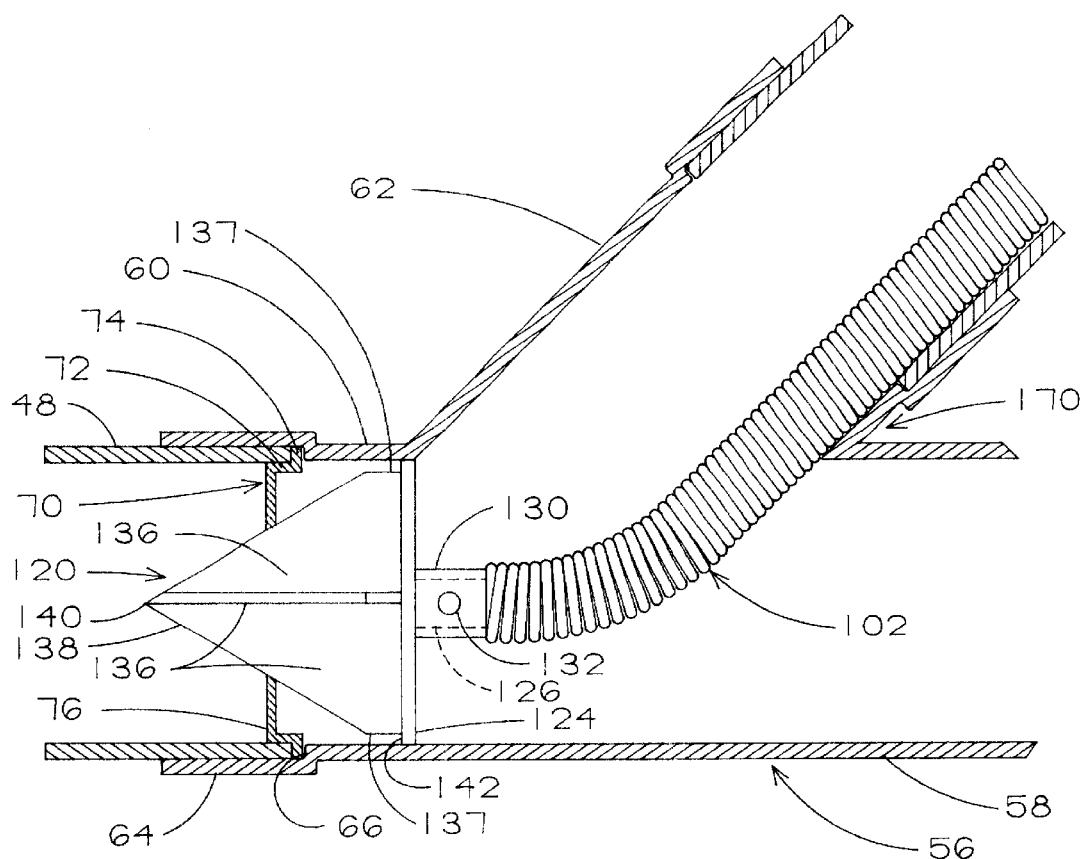
FIG. 13 is an enlarged fragmentary, vertical longitudinal section of the clean-out and part of the lower section of the drain pipe and showing the tool with its head in cutting engagement with the center plate of the cap.
Figure 11:
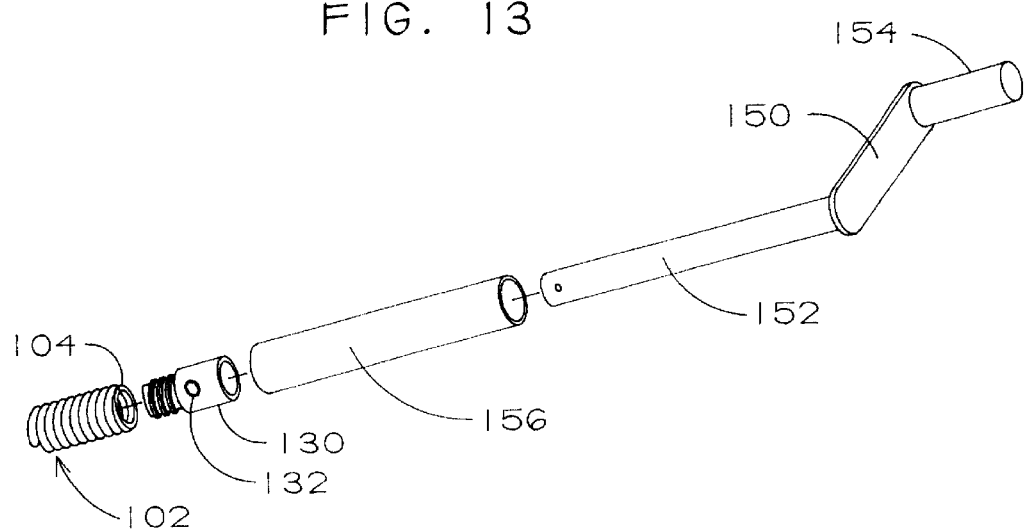
FIG. 11 is a reduced exploded isometric view of the tool of FIG. 7 and showing how the handles are connected to the shaft.

The plumbing tool 100 (FIG. 7–11) also includes a penetrating and reaming operating head 120 with a conical configuration releasably attached to the lower end 106 of the tool shaft 102. The cutting head has a mounting ring 122 disposed perpendicularly of the axis of the shaft when the shaft is straight and unflexed as in FIG. 7, a cruciform mounting bracket 124 secured within the ring, and a hub 126 extending from the bracket axially of the ring. The outside diameter of the mounting ring is of a dimension suitable for the size of clean-out 56 being used go that the ring will slidably and rotatably fit within the clean-out (FIG. 13). A lower coupling 130 (FIG. 9) is connected to the lower end 106 of the spring shaft, is fitted over the hub, and is fastened thereto by a set screw 132 on the coupling.

More specifically, the lower coupling 130 (FIG. 9) has a female sleeve 134 that slips over the hub 126. The hub has a hole 128 that is aligned with and receives the set screw 132 to secure the coupling to the mounting ring 122. The lower coupling also has a threaded male stub 135 that threads into the lower end 106 of the spring shaft 102 thereby to secure the coupling to the shaft. It will be understood that the coupling 130 allows different sizes of cutting heads 120 to be connected to the tool shaft depending on the diameter of the drain pipe involved.

The operating head 120 (FIGS. 7, 8, and 13) also has a plurality of triangular or reaming cutting 136 rigidly secured to and projecting endwardly from the mounting ring 122 and bracket 124. Four blades are used in the disclosed embodiment and are positioned in the four quadrants of the mounting ring and bracket with the base edges of blades welded to the mounting ring and bracket and the altitude edges of the four blades welded together along the axis of the ring. The blades have axial guiding edges 137 and cutting edges 138 converging to a sharp point or tip 140 of the head. The base edges are set radially inwardly (FIGS. 8 and 13) of the outside diameter of the mounting ring to leave an annular stop rim 142 circumscribing the blades adjacent to the mounting ring for a purpose to be described. When the tool shaft 102 is straight and unflexed (FIG. 7), the tip of the head projects endwardly from and in coaxial alignment with the shaft.

In addition, the plumbing tool 100 (FIGS. 7 and 11) has a handle 150 that includes a crankshaft 152 connected to the upper end 104 of the tool shaft 102 and a crankhandle 154 projecting from the crankshaft. The crankshaft is connected to the tool shaft by an upper coupling 130 and set screw 132 in the same manner as the cutting head 120 is connected to the tool shaft, as described above. The handle also includes a holding sleeve 156 rotatably received on the crankshaft between the upper end of the upper coupling and the crankhandle.

It is to be noted that the length of the tool shaft 102 can be changed by connecting sections of springs, as 108, for example each about two feet in length, together by intermediate couplings, not shown, but similar to the upper and lower couplings 130. As contrasted with the upper and lower couplings, however, the intermediate couplings have threaded male stubs at both ends for threading into adjacent open ends of adjacent springs. Thus, by having a supply of the sprig sections and the intermediate couplings, the shaft can be made longer or shorter to suit particular jobs. Also, although the shaft in disclosed embodiment is a single length of spring preferably about four feet long, it may be made up of shorter lengths of springs (for example, and as above noted, each about two feet long) equaling four feet or any other desired length.

The plumbing tool 100 (FIG. 7) is held by grasping the sleeve 156 in one hand and the crankhandle 154 in the other hand. The tool shaft 102 and thus the operating head 120 are rotated by turning the crankhandle while holding the sleeve. Also, the tool shaft has sufficient rigidity to allow force to be transmitted through and axially of the shaft to the tip 140 by grasping the sleeve in one hand and the crankhandle in the other and thrusting the tool axially of the tool shaft. Such rotation and axial thrusting can be accomplished at the same time whether the tool shaft is straight or flexed.

Figure 12:
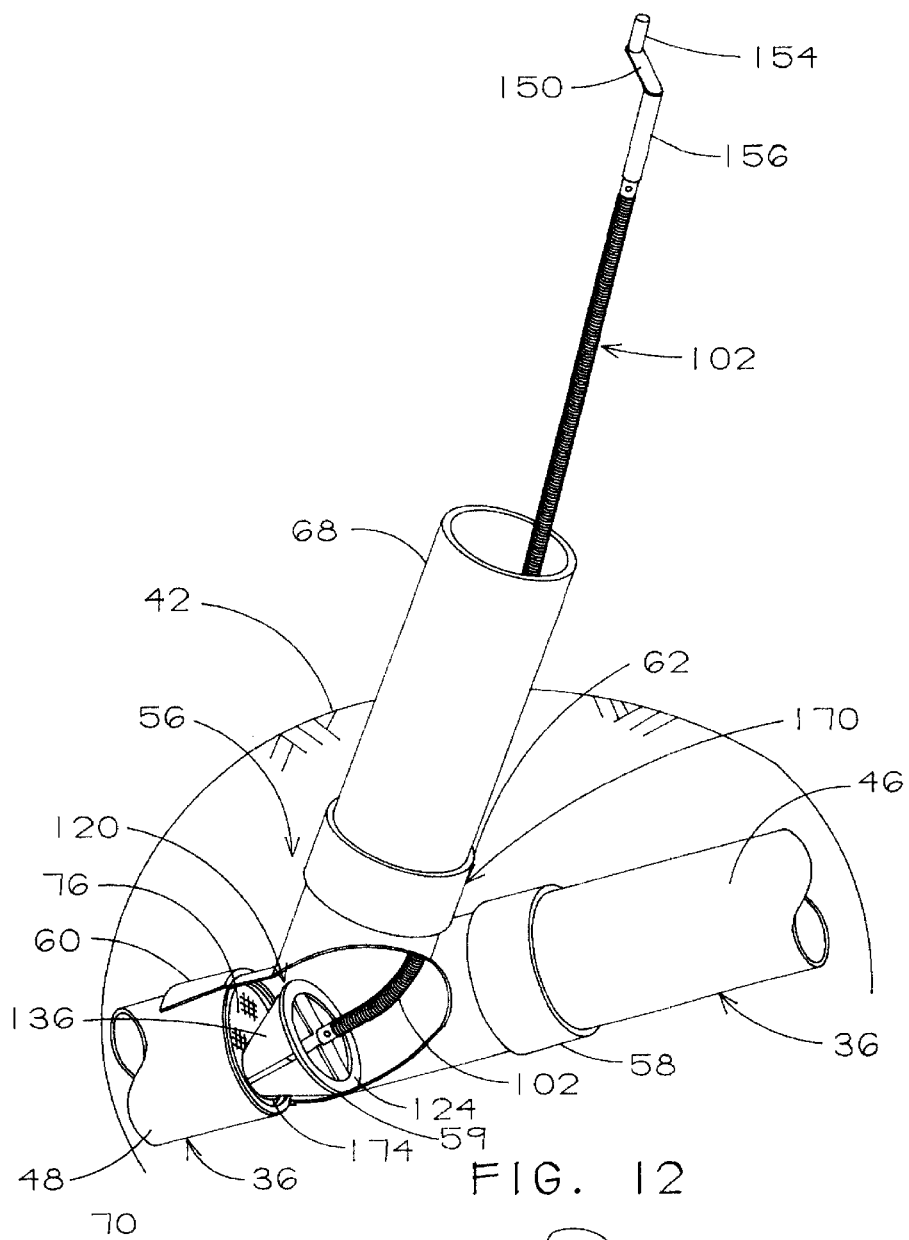
FIG. 12 is an isometric view similar to and on the same scale as FIG. 3 with an extension pipe connected to the clean-out, with the tool of FIG. 7 extended into the clean-out, and with part of the clean-out broken away to show the head of the tool in penetration and reaming engagement with the center plate of the test cap.

The plumbing tool 100 is used to carry out the method of the present invention after all necessary pressure tests have been successfully completed. To this end, the cover 69 (FIG. 6) is removed and the operating head 120 of the tool is inserted in the riser 68 (FIG. 12) and lowered down into the clean-out 56. The mounting ring 122 slidably engages the interior of the riser and the clean-out branch 62 and guides the head down the clean-out until it exits the clean-out branch and strikes the base 59 of the clean-out (FIG. 12). Axial thrust is then imparted to the fifes tool shaft 102 to cause the head to tip over from a generally vertical attitude, not shown, into the generally horizontal attitude shown in FIG. 12, with the mounting ring engaging the base of the clean-out and the tip 140 pointing toward the test cap 70. Such tipping is facilitated by the flexibility of the shaft and the engagement of the shaft with the clean-out branch along area 170, but also by the downward slope of the drain pipe 36.

When in this generally horizontal position (FIGS. 12 and 13), further axial pressure on the tool shaft 102 causes the cutting head 120 to move axially downwardly of the drain pipe 36 toward the outlet branch 60. Because of the combined transverse flexibility and axial rigidity of the tool shaft and the leveraging effect of the shaft bearing against the clean-out branch 62 and/or the riser 68 at region 170, this axial pressure on the tool shaft causes the tip 140 of the cutting head to move into engagement with the center plate 76 of the test cap 70. Then, the shaft is thrust sharply downwardly to force the tip of the cutting head to penetrate the plate, creating an initial hole 174 (FIG. 12) in the plate.

Figure 14:
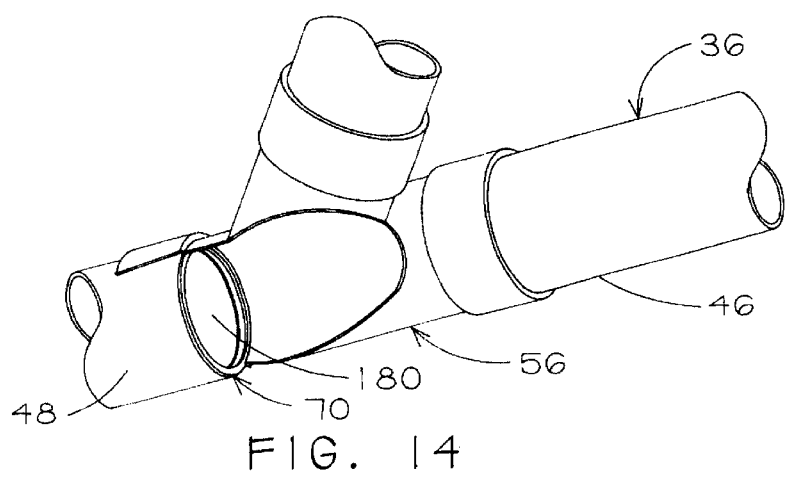
FIG. 14 is a view similar to FIG. 12 but with the tool removed and with the clean-out broken away to show how the head has completely removed the center plate of the test cap thereby to open the drain pipe for movement of drain materials therethrough.

Thereafter, while continuing to apply axial downward pressure on the tool shaft 102 (FIG. 13), the tool shaft and the operating head 120 are rotated with the crankhandle 154 to begin cutting away or reaming out the center plate. The mounting ring 122 is soon rotatably slidably received in the outlet branch 60 and thereafter guides movement of the or reaming head axially along the outlet branch. As the cutting action continues, the guiding edges 137 move within the annular body 72 of the test cap 70 to guide and center the head. When the stop rim 142 strikes the radial flange 74, the blades will have substantially completely cut or reamed out the center plate 76 from within the annular body 72 of the test cap to provide a large opening 180 (FIG. 14) in the test cap. This opening 180 is the about the same diameter as the inside diameter of the body since the diameter of the cutting head at the guiding edges 137 is the about the same diameter as the inside diameter of the body. In turn, the inside diameter of the body is just slightly less than the inside diameter of the drain pipe, so that creating the opening 180 will allow waste material to move essentially unimpeded through the pipe.

After the opening 180 has been created, the tool 100 is pulled back out of the outlet branch 60 and thence out of the clean-out branch 62 and riser 68. Because the stop rim 142 contacts the radial flange 74 of the test cap 70, the operating head 120 does not hang-up or become locked in the clean-out. It is also to be noted that the removed material i.e., the cut fragments, not shown of the center plate are subsequently flushed down the lower section 48 of the drain pipe to the sewer line 38.

From the foregoing it will be understood that an improved method for testing a newly installed plumbing system has been provided including a tool 100 used in carrying out the method. The method is more cost-effective because it avoids having to re-test a plumbing system 20 that would have passed the test but did not only because the test plug failed. Since the method does not use inflatable test plugs to seal off the drain pipe 36 while doing the testing, the common failure of the inflatable plug does not cause a failed test. Instead, the method involves use of a test cap which positively seals the drain pipe and allows an accurate test of the plumbing system. The test cap and its positive seal can be employed because the method also uses the tool 100 that can be extended into the clean-out and operated from a remote position to create an opening 180 in the cap and remove the blockage from the pipe. It will be recognized that although the method and tool have been described and shown with an underground clean-out, they can be used equally as well when the clean-out is in a basement or otherwise above ground.

Although a preferred embodiment of the present invention has been shown and described, various modifications and substitutions may be made thereto without departing from the spirit and scope of tile invention. Accordingly, it is to be understood that the present invention has been described by way of illustration and not limitation.

What is claimed is:

1. A method of using a manually-operated tool to provide an opening through a test plug that prevents flow through a flow passage of a pipe of a plumbing system after the system on one side of the plug has been successfully tested for leaks with no leaks in the system; wherein the plumbing system has a clean-out extending from the pipe, communicating with the flow passage, and providing access to the test plug; and wherein the tool includes an elongated flexible, rotatable shaft and a test-plug-penetrating and reaming head connected to the shaft and axially movable and rotatable therewith, comprising the steps of:

manually grasping the tool and inserting the head and the shaft into the clean-out until the head is in the flow passage in opposed relation to the test plug;

manually axially pressing on the shaft to force the bead through the test plug; and manually rotating the shaft while in engagement with the test plug to ream out an opening through the test plug.

2. The method of claim 1, wherein during the inserting step, placing the flexible portion of the shaft against the clean-out; and wherein during the pressing step, leveraging the flexible portion against the clean-out as the head is penetrating the plug.

3. The method of claim 1, wherein the plug is plastic.

4. A method of testing a plumbing installation wherein a clean-out extends laterally from a flow passage in the installation, wherein a tool is used that includes an elongated resiliently flexible shaft and an operating head having penetrating and reaming surfaces and being connected to the shaft for rotation and axial movement therewith, and wherein a test cap is used that can block the flow passage but can be penetrated by the head of the tool, comprising the steps of:

securing the test cap in the flow passage adjacent to the clean-out so that the cap blocks flow through the passage;

testing the system for leaks on one side of the test cap;

following such testing wherein there are no leaks, inserting first the head and then the shaft of the tool into the clean-out so as to position the head in the flow passage in adjacent facing relation to the test cap and with the shaft extending upwardly out of the clean-out;

axially downwardly thrusting the shaft thereby causing the head to penetrate the test cap; and rotating the head by rotating the shaft thereby reaming out the test cap.

5. The method of claim 4, wherein during the inserting step, placing the shaft against the clean-out; and wherein during the thrusting step, leveraging the shaft against the clean-out to assist in causing the head to penetrate the test cap.

6. The method of claim 4, wherein the head has a diameter at least equal to the inside diameter of the passage; and wherein during the rotating step the head engages the inside diameter of the passage and substantially completely removes the part of the cap in the passage, thereby to provide an opening at the location of the cap that is substantially the same transverse dimension as the passage.

7. A method of testing a plumbing system including a drain line, comprising the steps of:

installing a test plug in the drain line thereby preventing flow through the line past the plug;

testing the plumbing system by applying fluid pressure in the plumbing system on the one side of the plug thereby to test the plumbing system for leaks;

after the testing is successfully completed with no leaks present, applying force against the plug lengthwise of the line in the direction of the desired flow therethrough sufficient to create an opening through the plug, whereby flow can occur in the drain line through the plug and whereby parts of the plug are removed; and flushing the removed parts of the plug along the line away from the location of the plug.

8. The method of claim 7, including the step of covering the portion of the drain line that contains the plug so that the plug is inaccessible except through an access opening leading to the plug whereby access to the plug can be achieved without disconnecting the drain line from the plumbing system; and wherein the applying step involves extending a tool through the access opening for engaging the plug and applying said force with the tool against the plug.

9. The method of claim 8, wherein the tool includes an elongated flexible shaft having opposite ends, an operating head attached to one end of the shaft, and an operating handle attached to the opposite end of the shaft; and wherein the applying step involves extending the head and the shaft through the access opening to move the head into engagement with the cap, thence penetrating the cap with the head, and thereafter rotating the head against the cap by turning the handle thereby to ream out the cap from the pipe.

10. A plumbing tool for creating a flow passage through a test plug in a pipe wherein a clean-out is connected to the pipe adjacent to the plug and has a branch that extends outwardly from the pipe, the branch having an opening for enabling access by an operator to the plug through the clean-out from the operator's position adjacent to the opening in the branch, there being a predetermined distance between the test plug and said operator's position, comprising:

an operating head;

a shaft having axial rigidity and resilient transverse flexibility, the shaft also having a lower portion connected to the operating head and an upper handling portion;

a tubular handle rotatably connected to said handling portion; and a crankhandle connected to the handling portion, the length of the tool from the head to the crankhandle being approximately equal to said predetermined distance.

11. The tool of claim 10, wherein the lower flexible portion is a coil spring.

12. The tool of claim 10, wherein the head has penetrating and reaming surfaces.

13. A tool for providing an opening through a test plug that is secured in a drain line to block flow therethrough and wherein a clean-out branch connected to the drain line provides access to the plug after a plumbing test has been completed, there being a predetermined distance from the test plug through the clean-out branch to an operator's position adjacent to the clean-out branch, comprising:

a test plug-penetrating and reaming head;

a shaft having resilient transverse flexibility and axial rigidity and being connected to the head, said shaft being capable of flexing from a straight condition into a curved condition and being capable of transmitting force axially thereof in both conditions; and a handle on the shaft capable of axially pressing on the shaft and rotating it while in both of said conditions, the length of the tool from the head to the handle being approximately the same as said predetermined distance.

14. A tool for penetrating a test plug blocking flow in a pipe by placing the tool in an operating position wherein the tool is inserted into a clean-out connected to the pipe adjacent to the plug, comprising:

a resiliently flexible shad having proximate and distal ends;

a crankhandle connected to the proximate end of the shaft; and an operating head connected to the distal end of the shaft, the head having penetrating and reaming blades thereon capable of penetrating the test plug and reaming an opening therethrough, the shaft and the head each having an axis of rotation, the length of the shaft being only of such length as to allow an operator to hold the crankhandle when the tool is in its operating position with the shaft in the clean-out and the head in engagement with the plug, the shaft having a normally straight unstressed condition but being capable of being resiliently manually transversely flexed out of the straight condition upon application of sufficient manual force when the tool is in its operating position, so that the axis of the shaft can be curved adjacent to the head and the axis of the head can be placed at an angle to the axis of the shaft adjacent to the handle, the shaft in the operating position of the tool being capable of transmitting force axially thereof upon application of manual force to the handle and axially of the shaft to force the head against the plug, and the shaft being capable of rotating the head against the plug while in said operating position.

15. A method of testing a plumbing system including a drain line, comprising the steps of:

installing a disc in the drain line thereby to prevent flow through the line past the disc;

testing the plumbing system by applying fluid pressure in the drain line against the disc thereby to test the plumbing system for leaks;

creating an opening through the disc, after the testing is successfully completed with no leaks, by removing material therefrom while allowing the removed material to remain in the drain line; and flushing the removed material down the drain line.

16. The method of claim 15, wherein the method includes the further steps of:

penetrating and reaming out the disc during the creating step.

17. The method of claim 15, including the further steps of:

causing the disc to be inaccessible except through an access opening leading to the disc whereby access to the disc can be achieved without disconnecting the drain line from the plumbing system; and wherein the creating step involves the steps of extending a tool through the access opening into engagement with the disc; and causing said removed material of the disc to be forced into the drain line on the opposite side of the disc from the tool.

18. The method of claim 17, wherein the tool includes an elongated flexible shaft having opposite ends, a penetrating and reaming head attached to one end of the shaft, and an operating handle attached to the opposite end of the shaft, wherein the creating step involves the steps of:

extending the head and the shaft through the access opening to move the head into penetrating engagement with the disc; and thereafter rotating the head against the disc by turning the handle thereby to ream out the disc.

19. The method of claim 18, wherein the extending step further includes axially thrusting the head against the disc by holding the handle and axially thrusting the shaft toward the disc.

20. The method of claim 18, wherein the creating step involves the step of:

reaming out the disc so that the opening through the disc is of substantially the same diameter as the drain line and provides for substantially smooth movement of drainage material through the drain line.

21. The method of claim 15, wherein the disc is of plastic material; wherein the method includes the further steps of:

installing a first stage of the system including the drain line;

welding the disc in fluid-tight relation in the drain line during installation of the first stage;

applying a first test of fluid pressure in the plumbing system after the first stage is installed;

installing a second stage of the plumbing system;

applying a second test of fluid pressure in the plumbing system to test the plumbing for leaks after the second stage is installed; and wherein the creating step includes removing said material from the disc only after the second test pressure has been relieved.

22. The method of claim 21 wherein the method includes the further steps of:

leaving the portion of the drain line that contains the disc exposed during said first stage;

covering the portion of the drain line that contains the disc during said second stage while providing an access opening to the plug without disconnecting the drain line from the plumbing system; and wherein the creating step involves accessing the disc through the access opening to remove said material from the disc.

23. The method of claim 22, wherein the drain line includes a drain pipe having an upper section connected to the remainder of the plumbing system and a lower section adapted to be corrected to a sewer line; wherein the method further includes the steps of:

joining the upper and lower sections of the drain pipe with a clean-out that has inlet and outlet branches respectively attached to the upper and lower sections of the drain pipe and constituting part of said drain line and a clean-out branch in fluid communication with the inlet and outlet branches;

wherein the installing step involves welding the disc in the drain line adjacent to the lower section of the drain pipe before the outlet branch of the clean-out is connected to the lower section;

wherein the disc is accessible from outside the plumbing system through the clean-out branch; and wherein the creating step is performed through the clean-out branch of the clean-out.

24. A method of using a tool to penetrate and ream out disc for a plumbing system; wherein the plumbing system has a clean-out element with a first section secured between sections of a drain pipe; wherein the disc is secured in fluid-tight relation in and to one of said sections of the drain pipe whereby the disc creates a fluid-tight seal against flow through the drain pipe; wherein the clean-out element has a second section extending from the drain pipe and provides access to the center plate through the second section after a plumbing test has been successfully completed with no leaks; wherein the tool includes a rotary, disc penetrating and reaming head, an elongated transversely flexible shaft connected to the head and being resiliently flexible from an unstressed straight condition to a stressed curved condition, and a handle connected to the shaft to rotate the head and axially thrust the shaft and head, said shaft possessing axial rigidity lengthwise thereof from the handle to the head when in straight or flexed condition, comprising the steps of:

inserting the head and the shaft into the second section of the clean-out element until the head engages the first section of the clean-out element;

pressing on the handle axially of the shaft to bend the shaft adjacent to the head and force the head into engagement with the disc within a portion of the drain pipe;

applying a tog force on the handle axially of the shaft to force the head through the disc; and rotating the shaft and thus the head with the handle to cause the head to ream out an opening in the disc for establishing fluid communication through the drain pipe.

25. A tool for creating an opening through a test cap that is secured in a drain line to block flow therethrough and wherein a clean-out branch connected to the drain line provides access to the cap after a plumbing test has been completed with no leaks existing, comprising:

a penetrating and reaming head for penetrating through the test cap and reaming an opening therein;

a resiliently flexible shaft connected to the head for extending the head into the clean-out branch and into engagement with the test cap, said shaft being capable of flexing in the clean-out branch and a portion of the drain line to enable the engagement with the test cap; and a handle connected to the shaft for axially thrusting and rotating the shaft while in such flexed condition to rotate the head while axially forcing it against the test cap thereby to cause the head to penetrate and ream out an opening in the cap so that the drain line is open and provides a passageway through which waste can flow to a sewer line.

26. The tool of claim 25, wherein the head has an axis of rotation and includes a plurality of blades radially extending from the axis in circumferentially spaced relation to each other, said blades converging toward the end of the head.

27. The tool of claim 25, wherein the head has means for guiding it axially within the clean-out.

28. The tool of claim 25, wherein the head has means for guiding it axially of the test cap while the head is reaming out the opening.

29. The tool of claim 25, wherein the handle includes a crank secured to the shaft and a sleeve rotatable relative to the shaft.

30. The tool of claim 25, wherein the flexible shaft is a coil spring.

31. A tool for removing the center plate of a test cap in a drain pipe that blocks flow therethrough and wherein a clean-out connected to the drain pipe provides access to the cap after a plumbing test has been completed, comprising:

an operating head including penetrating and reaming blades thereon;

a transversely flexible shaft having axial rigidity and being connected to the head for extending the head into the clean-out branch and into engagement with the center plate of the test cap within a portion of the drain pipe; and a handle connected to the shaft for axially thrusting and rotating the shaft to rotate the head while axially forcing it against the center plate of the test cap, thereby to cause the head to penetrate and ream out the center plate and to create the opening therein, wherein the shaft has a longitudinal axis;

wherein the shaft is resiliently transversely flexible;

wherein the shaft has a normally straight unstressed condition but can be flexed out of the straight condition upon application of sufficient force; and wherein the shaft can transmit force axially thereof while in straight or flexed condition whereby the head can be forced against and through the center plate of the cap by applying force on the shaft axially thereof toward the head while rotating the head.

32. A method of testing a plumbing system having a lateral branch providing access to a fluid-carrying line of the system, comprising the steps of:

providing a fluid-tight blockage in the line on the downstream side of the branch;

pressurizing the line against the upstream side of the blockage to test for leaks in the system;

after the pressurizing step has been successfully completed with no leaks occurring, accessing the blockage through the branch, impacting it, and removing material from it thereby creating an opening, through the blockage; and flushing the removed material down the line.

33. The method of claim 32 wherein the line has an inside diameter adjacent to the blockage, wherein the removing step creates an opening through the blockage that is substantially the same diameter as the inside diameter of the line.

34. A method of temporarily sealing a fluid carrying line in a plumbing system in order to test the system for leaks, comprising the steps of:

sealing the line with a fragmentable blockage;

testing the system for leaks by exerting pressure against the blockage;

after the pressurizing step has been successfully completed with no leaks occurring, fragmenting the blockage and unblocking the line; and flushing the fragments down the line.

35. The method of claim 34, wherein the fragmenting step is accomplished by applying an upstream force against the blockage sufficient to penetrate and fragment the blockage.

36. The method of claim 34, wherein the fragmenting step removes the blockage throughout substantially the fill inside diameter of the line thereby restoring the capability of fall fluid flow in the line.

37. A plumbing tool for removing a blockage from a line, comprising:
   an operating head having penetrating and cutting blades;
   a rotatable shaft including an upper crankshaft and a lower tool shaft,
      the tool shaft being a tightly wound coil spring having an upper end connected to the crankshaft and a lower end connected to the operating head,
         the spring extending along a substantially straight line from its upper end throughout a substantial part of its length but being capable of flexing transversely of said line throughout the remainder of its length to its lower end;
   a crankhandle connected to the crankshaft for imparting rotation to the crankshaft and spring,
      the spring being capable of transmitting trust to the head caused by force directly applied to the shaft with the crankhandle, said thrust being transmitted along the substantially straight part of the spring and thence along said remainder of the spring to the head in both the rotating and non-rotating conditions the shaft, said transmitted thrust being great enough to allow the blades of the head to penetrate the blockage without rotating the shaft and being present to assist the blades to ream out the blockage during rotation of the shaft; and
   a tubular handle rotatably circumscribing the crankshaft.

38. The tool of claim 37,
wherein the spring is flexed transversely of said line throughout said remainder of its length.

39. The tool of claim 37,
wherein the diameter of the coil spring is about ¾ inch.

40. The tool of claim 37, wherein the shaft is about four feet in length.

41. A plumbing apparatus for removing a blockage from a drain line, comprising:
   a clean-out adapted to be installed in the line adjacent to the blockage and having an access branch;
   an operating head in the clean-out and having penetrating and cutting blades adapted to engage the blockage, the head having an axis of rotation;
   a rotatable shaft having an upper crankshaft and a lower tool shaft,
      the tool shaft being a tightly wound coil spring having a lower end in the clean-out and connected to the operating head, the spring extending from the head transversely of the axis of rotation of the head into the branch and into engagement therewith and thence along a substantially straight line out of the branch to an upper end, the upper end being connected to the crankshaft,
      the spring being capable of transmitting thrust to the head caused by force directly applied to the shaft with the crankhandle, said thrust being transmitted through the spring in both the rotating and non-rotating conditions of the shaft, said transmitted thus being great enough to allow the blades of the head to penetrate the blockage without rotating the shaft and being present to assist the blades to ream out the blockage during rotation of the shaft; and
   a crankhandle connected to the crankshaft.

* * * * *